(12) United States Patent
Densham et al.

(10) Patent No.: US 7,973,515 B2
(45) Date of Patent: Jul. 5, 2011

(54) POWER MANAGEMENT SYSTEMS WITH CONTROLLABLE ADAPTER OUTPUT

(75) Inventors: William Densham, Los Gatos, CA (US); Han-Jung Kao, Taipei (TW); Liusheng Liu, San Jose, CA (US)

(73) Assignee: O2Micro, Inc, Santa Clara, CA (US)

( * ) Notice: Subject to any disclaimer, the term of this patent is extended or adjusted under 35 U.S.C. 154(b) by 246 days.

(21) Appl. No.: 12/157,698

(22) Filed: Jun. 12, 2008

(65) Prior Publication Data

US 2009/0001937 A1 Jan. 1, 2009

Related U.S. Application Data

(63) Continuation-in-part of application No. 11/821,042, filed on Jun. 20, 2007.

(60) Provisional application No. 60/905,679, filed on Mar. 7, 2007.

(51) Int. Cl.
*H02J 7/00* (2006.01)
*G08B 21/00* (2006.01)
*G01N 27/416* (2006.01)

(52) U.S. Cl. ........ 320/130; 320/134; 320/145; 320/148; 320/149; 320/150; 340/636.1; 340/659; 324/426

(58) Field of Classification Search ................ 320/130, 320/134
See application file for complete search history.

(56) References Cited

U.S. PATENT DOCUMENTS

| | | | |
|---|---|---|---|
| 6,208,117 B1 * | 3/2001 | Hibi | 320/134 |
| 6,268,710 B1 | 7/2001 | Koga | |
| 6,329,796 B1 * | 12/2001 | Popescu | 320/134 |
| 6,741,066 B1 * | 5/2004 | Densham et al. | 320/145 |
| 6,853,165 B2 | 2/2005 | Chen | 320/137 |
| 7,081,737 B2 | 7/2006 | Liu | |
| 7,088,076 B2 | 8/2006 | Densham et al. | 320/145 |
| 7,176,654 B2 | 2/2007 | Meyer et al. | 320/110 |
| 7,262,580 B2 | 8/2007 | Meyer et al. | 320/110 |
| 7,285,936 B2 | 10/2007 | Ohnuma et al. | |
| 7,312,219 B2 | 12/2007 | Dang et al. | 514/252.1 |
| 7,323,847 B2 | 1/2008 | Meyer et al. | 320/110 |
| 7,345,451 B2 | 3/2008 | Chen | 320/128 |
| 7,622,830 B2 | 11/2009 | Cioaca et al. | |
| 2002/0191421 A1 | 12/2002 | Liao et al. | |
| 2006/0145658 A1 | 7/2006 | Wang | |

(Continued)

FOREIGN PATENT DOCUMENTS

CN 1395756 A 2/2003

(Continued)

OTHER PUBLICATIONS

Cool charge controller with adapter power recognition function, OZ8770/1, (21 pages).

(Continued)

*Primary Examiner* — Edward Tso
*Assistant Examiner* — Yalkew Fantu

(57) ABSTRACT

A power management system includes a battery pack having a battery controller and includes an adapter operable for charging the battery pack and powering a system load. The adapter generates a power recognition signal indicative of a maximum adapter power and receives a control signal. The battery controller in the battery pack receives the power recognition signal and generates the control signal to adjust an output power of the adapter according to a status of the battery pack and a status of the system load.

28 Claims, 10 Drawing Sheets

U.S. PATENT DOCUMENTS

| | | |
|---|---|---|
| 2006/0164038 A1 | 7/2006 | Demers et al. |
| 2006/0291259 A1 | 12/2006 | Densham et al. ............... 363/63 |
| 2007/0273334 A1 | 11/2007 | Meyer ........................... 320/138 |
| 2008/0030168 A1 | 2/2008 | Hsu et al. ...................... 320/119 |

FOREIGN PATENT DOCUMENTS

| | | |
|---|---|---|
| CN | 1471192 A | 1/2004 |
| CN | 2676428 Y | 2/2005 |
| CN | 101145698 A | 3/2008 |
| EP | 1796243 A2 | 6/2007 |
| JP | 2000-197212 A | 7/2000 |
| JP | 2005151683 A | 6/2005 |
| JP | 2007-115472 A | 5/2007 |

OTHER PUBLICATIONS

English Translation of First Office Action for JP 2007-238300, Jan. 27, 2009.

English Translation for Third Office Action of Chinese Patent Application No. 2008100080937.

English Translation for Abstract of JP2005151683A.

* cited by examiner

POWER MANAGEMENT SYSTEMS WITH CONTROLLABLE ADAPTER OUTPUT

RELATED APPLICATION

This application is a continuation-in-part of the co-pending U.S. application Ser. No. 11/821,042, titled "Battery Management Systems with Controllable Adapter Output", filed on Jun. 20, 2007, which itself claims priority to U.S. Provisional Application No. 60/905,679, filed on Mar. 7, 2007, which is hereby incorporated by reference in its entirety.

TECHNICAL FIELD

The present invention relates to power management systems and in particular to power management systems with controllable adapter outputs.

BACKGROUND ART

FIG. 1 shows a block diagram of a conventional battery charging circuit 100. As shown in FIG. 1, the battery charging circuit 100 is implemented by an adapter 102, a pulse width modulation controller 108, a charger controller 110, and a battery protection circuit (not shown) in the battery pack 104. The adapter 102 outputs a fixed voltage, and a charger 106 (shown as the pulse width modulation controller 108 and the charger controller 110) steps down the output voltage of the adapter 102 by controlling power switches and a buck converter in block 112. Consequently, conventional battery charging circuits can be relatively large and costly.

FIG. 2 shows a block diagram of another conventional charging circuit 200. The charging circuit 200 includes a controllable adapter 202 and an external control chip shown as a charger controller 210. The external control chip (charger controller 210) controls an output power of the controllable adapter 202 according to a current/voltage of the battery pack 204. As shown in FIG. 2, the charging circuit 200 also needs an extra switch 212 to control a charging current of the battery pack 204. As a result, such battery charging circuits are also relatively large and costly.

Furthermore, in conventional charging circuits, due to unbalancing issues (e.g., cells in the battery pack may have different voltages/capacities), some cells may reach an overvoltage condition even though others have not yet been fully charged. Although a cell balancing circuit can be used to relieve cells from such unbalancing issues, cell balancing is typically enabled only when the battery is nearly fully charged, in order to avoid excessive heat generation. As a result of the limited balancing time, the cell balancing circuit may not be effective. In other words, the charging process is not accurate enough across all of the cells.

SUMMARY

In one embodiment, a power management system includes a battery pack having a battery controller and includes an adapter operable for charging the battery pack and powering a system load. The adapter generates a power recognition signal indicative of a maximum adapter power and receives a control signal. The battery controller in the battery pack receives the power recognition signal and generates the control signal to adjust an output power of the adapter according to a status of the battery pack and a status of the system load.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

In one embodiment, the present invention provides a battery management system with a controllable adapter output. In one such embodiment, the battery management system can adjust the adapter output (e.g., adapter output power, adapter output voltage, and adapter output current) according to individual cell status (e.g., cell voltage, cell current, cell temperature, and cell capacity) by a control circuit integrated in a battery pack, which saves space and reduces cost. As a result, the battery management system in the present invention is able to enable multiple charging modes (e.g., standard constant current charging mode, light constant current charging mode, standard constant voltage charging mode, light constant voltage charging mode) according to individual cell status. In one embodiment, battery charging will be terminated when all the cells are fully charged and so any undesirable condition (e.g., over-voltage, over-charge, over-current) can be avoided.

Figure 1:
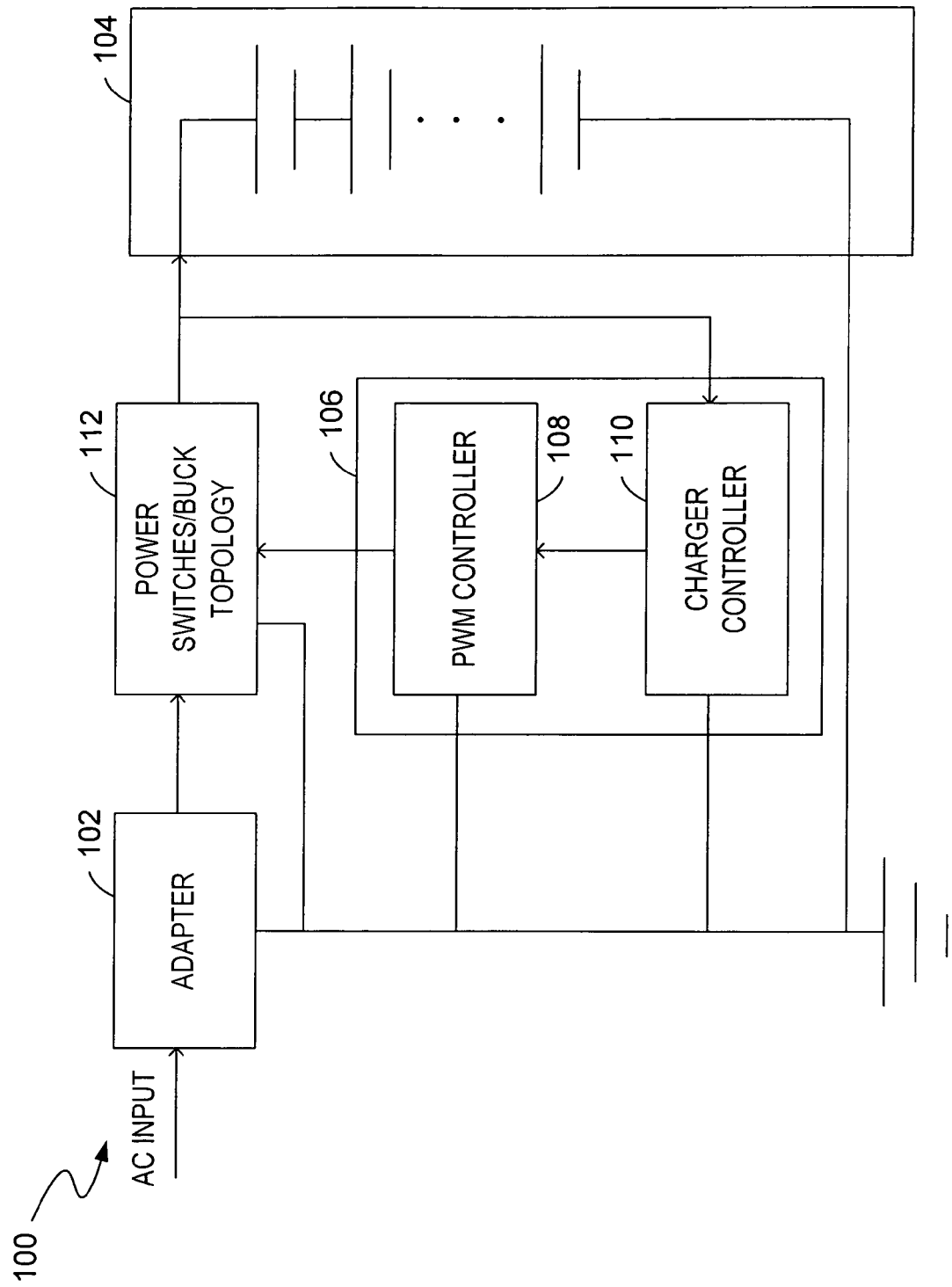
FIG. 1 shows a block diagram of a conventional battery charging circuit.
Figure 2:
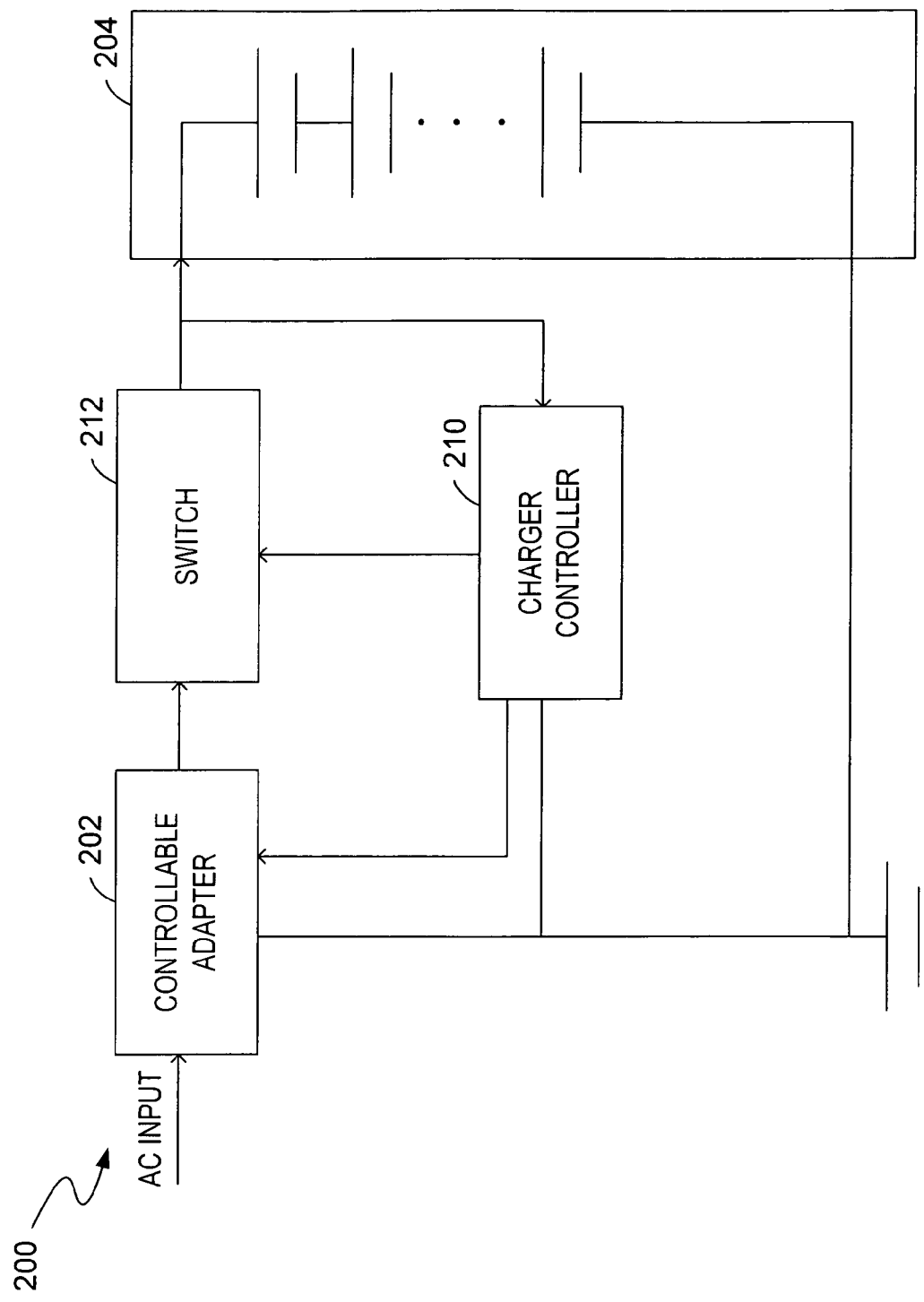
FIG. 2 shows a block diagram of a conventional charging circuit.
Figure 3:
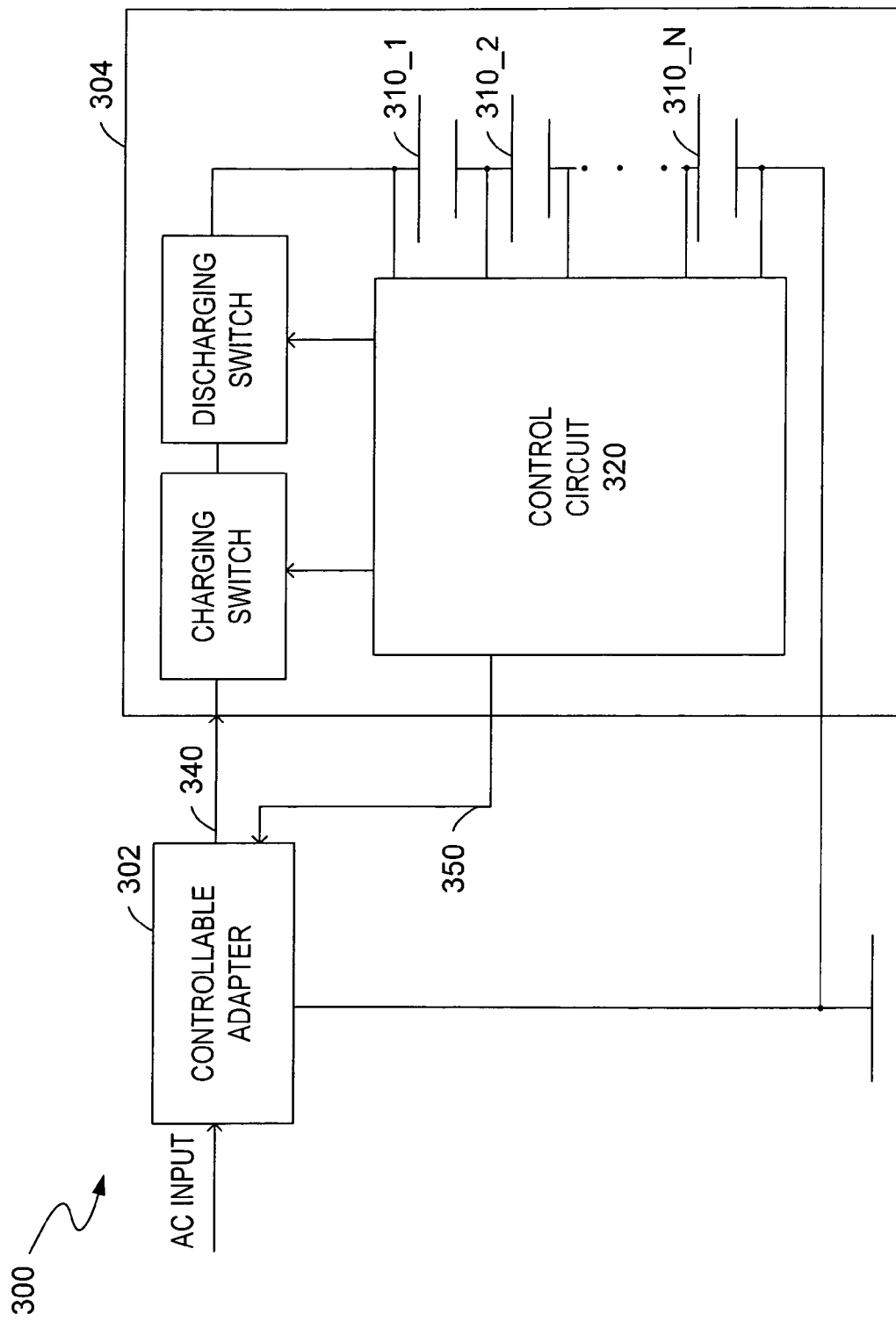
FIG. 3 shows a block diagram of a battery management system, in accordance with one embodiment of the present invention.

FIG. 3 shows a block diagram of a battery management system 300, in accordance with one embodiment of the present invention. The battery management system 300 includes an adapter 302 (e.g., a controllable adapter) for charging a battery pack 304 which has a plurality of cells 310_1, 310_2, ..., and 310_n.

A control circuit 320 can be used to monitor the battery pack 304 and generate a control signal 350 for controlling an output power of the adapter 302 in order to enable multiple charging modes, in one embodiment. More specifically, the control circuit 320 can be used to generate a control signal 350 according to a status (e.g., cell voltage, cell current, cell temperature, and cell capacity) of each cell of the plurality of cells 310_1-310_n in the battery pack 304. In one embodiment, the adapter 302 coupled to the control circuit 320 charges the battery pack 304. Advantageously, an output power at an output 340 of the adapter 302 is adjusted according to the control signal 350.

In one embodiment, the control circuit 320 is integrated in the battery pack 304. As such, the battery pack 304 is able to control the output 340 of the controllable adapter 302 directly according to individual cell status. Therefore, external control chips (e.g., charger controllers) and external power switches can be removed.

In one embodiment, the control circuit 320 enables, but is not limited to, standard constant current charging mode $CC_n$ (n=0), light constant current charging mode $CC_n$ (n=1, 2, ..., max, where max is a predetermined maximum number of n, which indicates the number of different light constant current charging modes), standard constant voltage charging mode $CV_m$ (m=0), light constant voltage charging mode $CV_m$ (m=1, 2, ..., max', where max' is a predetermined maximum number of m, which indicates the number of different light constant voltage modes), and charging termination mode. In one embodiment, a light constant current charging mode or a light constant voltage charging mode can be enabled when an unbalanced condition occurs. In one embodiment, the charging termination mode can be enabled when any undesirable/error condition occurs or when all the cells are fully charged.

Advantageously, a standard constant current charging mode $CC_0$ is enabled when the control signal 350 controls the adapter 302 to provide a constant charging current $I_0$ at output 340, in one embodiment. As such, the battery pack 304 is charged by a constant charging current $I_0$. A light constant current charging mode $CC_n$ (n=1, 2, ..., max) is enabled when the control signal 350 controls the adapter 302 to provide a constant light charging current $I_n$ (n=1, 2, ..., max) at output 340, in one embodiment. As such, the battery pack 304 is charged by a constant light charging current $I_n$ (n=1, 2, ..., max). In one embodiment, $I_0 > I_1 > I_2 > ... > I_{max}$.

Similarly, a standard constant voltage charging mode $CV_0$ is enabled when the control signal 350 controls the adapter 302 to provide a constant charging voltage $V_0$ at output 340, in one embodiment. As such, the battery pack 304 is charged by a constant charging voltage $V_0$. A light constant voltage charging mode $CV_m$ (m=1, 2, ..., max') is enabled when the control signal 350 controls the adapter 302 to provide a constant light charging voltage $V_m$ (m=1, 2, ..., max') at output 340, in one embodiment. As such, the battery pack 304 is charged by a constant light charging voltage $V_m$ (m=1, 2, ..., max'). In one embodiment, $V_0 > V_1 > V_2 > ... > V_{max'}$.

Advantageously, by enabling different charging modes ($CC_0, CC_1, ..., CC_{max}$ and $CV_0, CV_1, ..., CV_{max'}$) according to individual cell status, all the cells can be fully charged and any undesirable condition can be avoided, thereby extending the battery life.

As described above, in one embodiment, the control circuit 320 monitors individual cell status and controls an output power of the adapter 302 in order to enable multiple charging modes ($CC_0, CC_1, ..., CC_{max}$ and $CV_0, CV_1, ..., CV_{max'}$). In another embodiment, a control circuit can also be implemented outside the battery pack 304, which monitors battery pack 304 (e.g., battery pack voltage and battery pack current) and generates a control signal to enable multiple charging modes ($CC_0, CC_1, ..., CC_{max}$ and $CV_0, CV_1, ..., CV_{max'}$).

Figure 4:
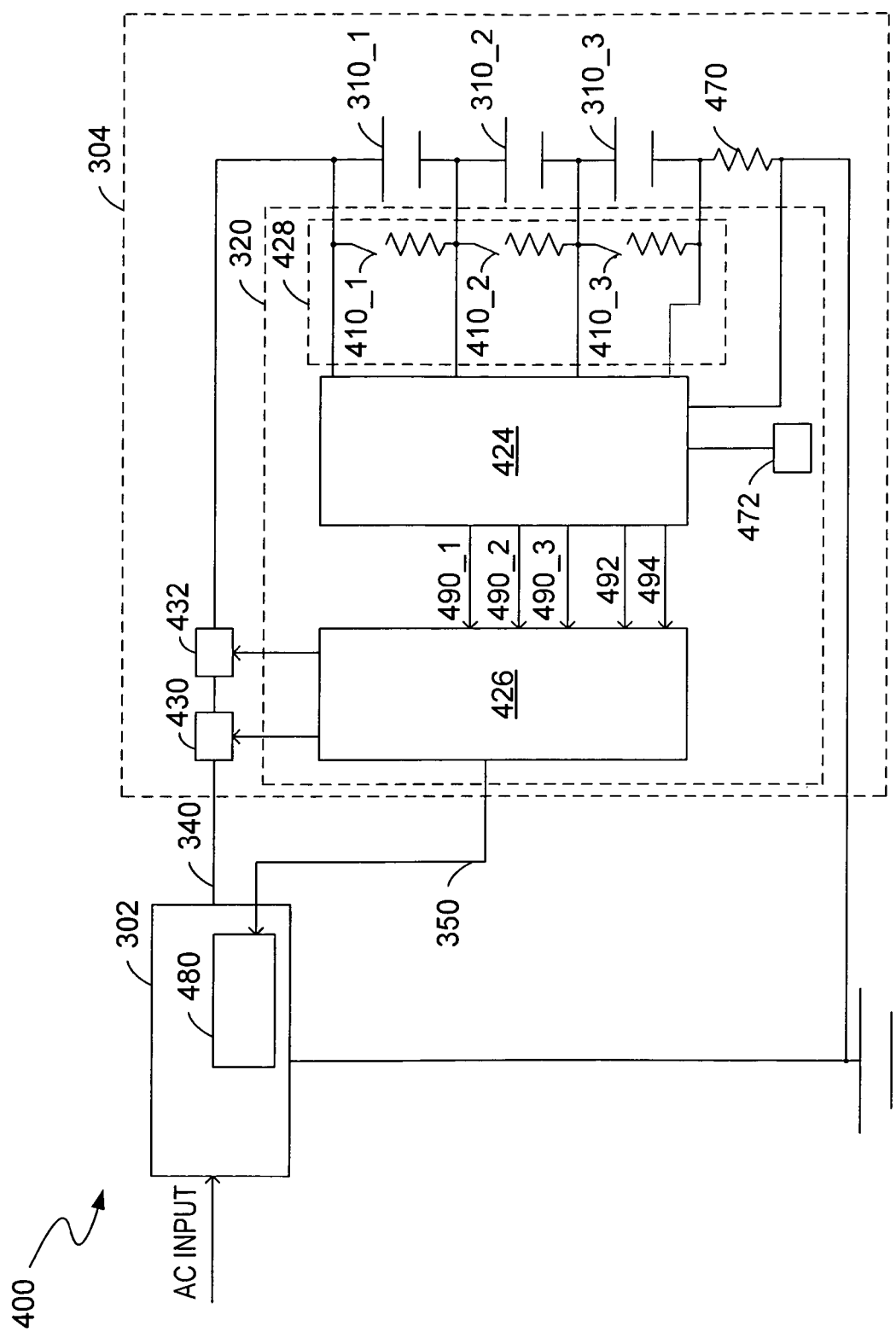
FIG. 4 shows another block diagram of a battery management system, in accordance with one embodiment of the present invention.

FIG. 4 shows another block diagram of a battery management system 400, in accordance with one embodiment of the present invention. Elements that are labeled the same as in FIG. 3 have similar functions and will not be repetitively described herein for purposes of brevity and clarity. In the example of FIG. 4, the battery pack 304 includes three cells 310_1, 310_2, and 310_3.

In FIG. 4, a monitoring circuit 424 (e.g., a gas gauge circuit) is configured to monitor a cell status (e.g., cell voltage, cell current, cell temperature, and cell capacity) for each individual cell 310_1-310_3, and protect each cell 310_1-310_3 from any undesirable conditions (e.g., over-voltage, over-current, over-temperature, and over-charge). In one embodiment, the monitoring circuit 424 monitors each cell 310_1-310_3 and generates a monitoring signal for each cell 310_1-310_3 indicative of the cell status.

For example, the monitoring circuit 424 monitors voltages of cells 310_1-310_3 and generates monitoring signals 490_1-490_3 indicating voltages of cells 310_1-310_3, respectively. In one embodiment, since all the cells 310_1-310_3 have the same current, the monitoring circuit 424 monitors a battery current via a sensing resistor 470 and generates a monitoring signal 492 indicating the battery current. In one embodiment, the monitoring circuit 424 also monitors a battery temperature via a temperature sensor 472, and generates a monitoring signal 494 indicating the battery temperature. In one embodiment, the monitoring circuit 424 can also monitor capacities of cells 310_1-310_3 and generates monitoring signals (not shown) indicating capacities of cells 310_1-310_3, respectively.

Advantageously, in one embodiment, a command converter 426 coupled to the monitoring circuit 424 generates a control signal 350 according to monitoring signals 490_1-490_3, 492 and 494. More specifically, the command converter 426 integrated in the battery pack 304 can be used to generate the control signal 350 for controlling an output power of the adapter 302 based on individual cell status. Accordingly, different charging modes can be enabled according to individual cell status, in one embodiment. In one embodiment, the command converter 426 is implemented outside the battery pack 304. In one such embodiment, the command converter 426 can receive monitoring signals 490_1-490_3, 492 and 494 via a serial bus coupled between the command converter 426 and the battery pack 304, for example, a 1-wire bus or a 2-wire bus (e.g., SMBus bus and I2C bus, etc.).

In one embodiment, the command converter 426 can be implemented by a processor (e.g., a microprocessor) or a state machine. In one embodiment, the command converter 426 enables, but is not limited to, standard constant current charging mode $CC_n$ (n=0), light constant current charging mode $CC_n$ (n=1, 2, ..., max), standard constant voltage charging mode $CV_m$ (m=0), light constant voltage charging mode $CV_m$ (m=1, 2, ..., max'), and charging termination mode.

In one embodiment, the control signal 350 is analog control signal. The analog control signal can be used to control a duty cycle of a pulse width modulation signal generated by a pulse width modulation signal generator 480. In one embodiment, the pulse width modulation signal generator 480 is in the adapter 302. By adjusting the duty cycle of the pulse width modulation signal, the output power of the adapter 302 at output 340 can be adjusted accordingly. In other words, different charging modes can be enabled by controlling the duty cycle of the pulse width modulation signal in the adapter 302, in one embodiment. For example, if a standard constant current charging mode ($CC_0$) needs to be enabled according to individual cell status, the analog control signal will adjust the duty cycle of the pulse width modulation signal, such that the adapter 302 outputs a constant current $I_0$.

In one embodiment, the control signal 350 is a digital control signal. A decoder can be implemented in the adapter 302 to convert the digital control signal to an analog control signal in order to control the duty cycle of the pulse width modulation signal in the adapter 302, in one embodiment.

Furthermore, the command converter 426 also controls a charging switch 430 and a discharging switch 432 in the battery pack 304, in one embodiment. In one embodiment, battery charging will be terminated when the charging switch 430 is switched off. The discharging switch 432 will be switched on when the battery pack 304 provides power to a system load (not shown), in one embodiment.

In one embodiment, a cell balancing circuit 428 for balancing cells 310_1-310_3 is included in the battery pack 304 in order to improve performance of cells 310_1-310_3. The cell balancing circuit 428 can be implemented outside the monitoring circuit 424 or inside the monitoring circuit 424. In one embodiment, a bleeding current (bypass current) can be enabled by the cell balancing circuit 428 for an unbalanced cell in order to reduce a current flowing through the unbalanced cell. As shown in the cell balancing circuit 428, a bleeding current of cell 310_1 is enabled when a switch 410_1 is switched on. A bleeding current of cell 310_2 is enabled when a switch 410_2 is switched on. A bleeding current of cell 310_3 is enabled when a switch 410_3 is switched on. Switches 410_1-410_3 can be controlled by the monitoring circuit 424 or the command converter 426. As such, the cell balancing circuit 428 can be controlled by the monitoring circuit 424 or the command converter 426.

Cell unbalanced conditions may include, but are not limited to, the following conditions. In one embodiment, a cell is unbalanced when the cell has a voltage difference relative to any other cell, where that voltage difference exceeds a predetermined voltage difference $\Delta V$. In another embodiment, a cell is unbalanced when the cell has a voltage which exceeds a predetermined threshold voltage $V_{balance}$. In yet another embodiment, a cell is unbalanced when the cell has a $$\frac{dV}{dt}$$

(a differential in cell voltage with respect to a differential in charging time) that exceeds a predetermined threshold $$\left(\frac{dV}{dt}\right)_{th}.$$

In yet another embodiment, a cell is unbalanced when the cell has a capacity difference relative to any other cell, where that capacity difference exceeds a predetermined capacity difference $\Delta C$.

Advantageously, as described above, the adapter 302 will charge the battery pack 304 with a smaller charging current (light constant current charging mode) when an unbalanced condition occurs. Therefore, the cell balancing circuit 428 will have a longer time to perform cell balancing (by enabling bleeding current) in order to fully charge all the cells.

Figure 5:
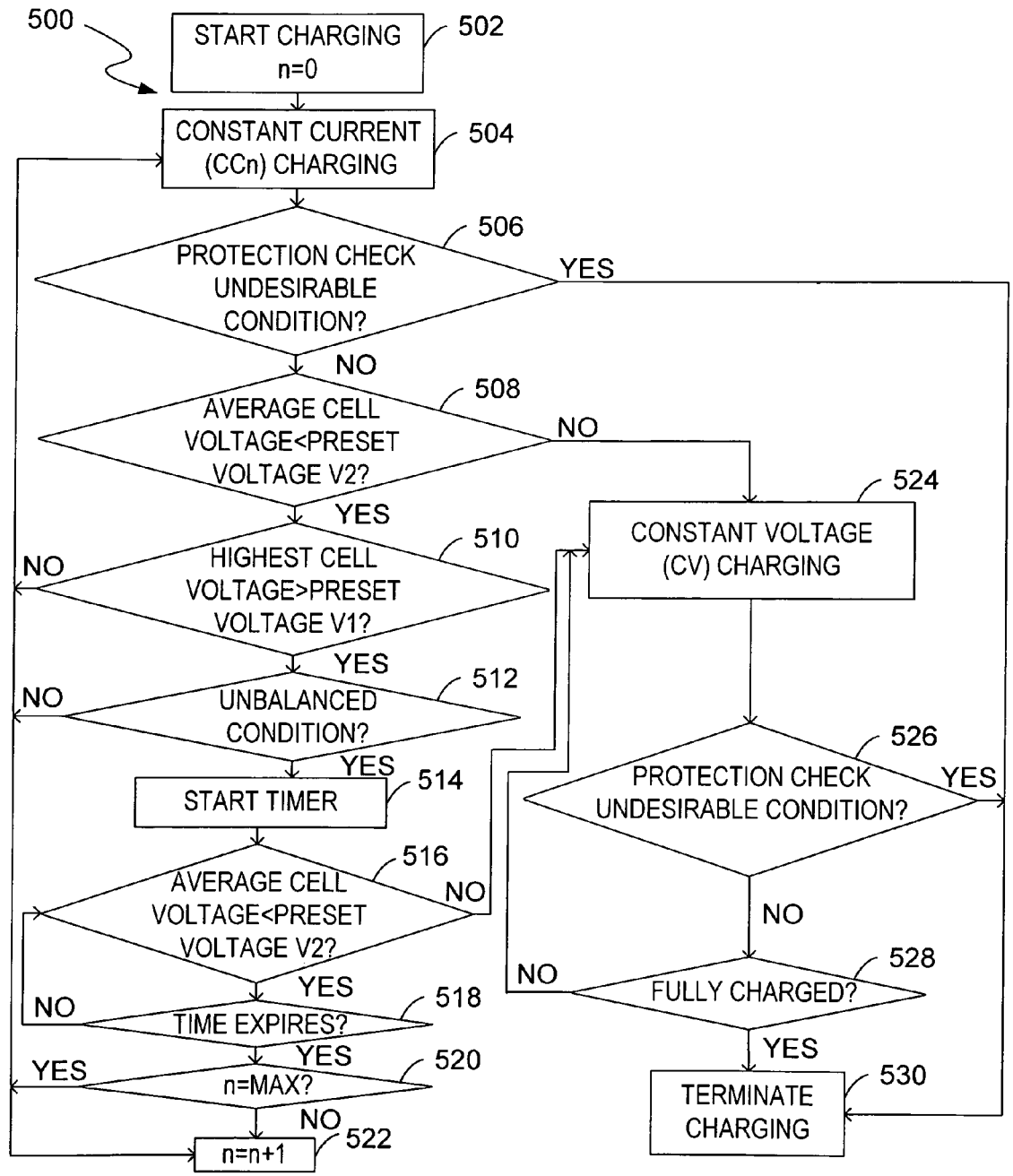
FIG. 5 shows a flowchart of operations performed by a battery management system, in accordance with one embodiment of the present invention.

FIG. 5 shows a flowchart 500 of operations performed by a battery management system, in accordance with one embodiment of the present invention. In one embodiment, the command converter 426 can be configured, such that the battery management system in FIG. 4 operates in a way shown in flowchart 500. More specifically, flowchart 500 illustrates which charging mode will be enabled by the command converter 426 according to different cell status, in one embodiment. FIG. 5 is described in combination with FIG. 3 and FIG. 4.

In the example of FIG. 5, the battery management system first charges the battery pack 304 in a standard constant current charging mode $CC_0$, in one embodiment. The battery management system charges the battery pack 304 in light constant current charging modes $CC_n$ (n=1, 2, ..., max) if any unbalanced condition occurs, in one embodiment. If a highest cell voltage (e.g., if cell 310_1 has a voltage of 3.80V, cell 310_2 has a voltage of 3.90V, and cell 310_3 has a voltage of 4.05V, then the highest cell voltage is equal to 4.05V) of the battery pack 304 is greater than a preset voltage V1 (e.g., 3.9V for Lithium Ion cells), the battery management system will perform an unbalance check to see if there is any unbalanced condition, in one embodiment. In one embodiment, when there is an unbalanced condition, the battery management system not only enables a bleeding current for any unbalanced cell by the cell balancing circuit 428, but also adjusts (e.g., reduces) a charging current of the battery pack 304. If an average cell voltage of the battery pack 304 is greater than a preset voltage level V2 (e.g., 4.2V for Lithium Ion cells), the battery management system charges the battery pack 304 in a constant voltage charging mode (e.g., a standard constant voltage charging mode $CV_0$), in one embodiment. The battery management system also performs a protection check, in one embodiment.

The battery management system starts charging the battery pack 304 and n (which represents different constant current charging modes) is initialized to 0 in block 502. A constant current charging mode $CC_n$ is enabled by the control signal 350 in block 504. For example, when n is set to 0, a standard constant current charging mode $CC_0$ will be enabled. When n is between 1 and max, a light constant current charging mode $CC_n$ (n=1, 2, ..., max) will be enabled. A protection check is performed in block 506. For example, the command converter 426 receives monitoring signals from the monitoring circuit 424 and determines whether any undesirable condition (e.g., over-voltage, over-current, and over-temperature) has occurred, in one embodiment. If there is any undesirable condition, the flowchart goes to block 530 to terminate battery charging (charging termination mode). As such, the command converter 426 will switch off the charging switch 430 to terminate battery charging. If there is no undesirable condition, the flowchart goes to block 508.

In block 508, an average cell voltage of the battery pack 304 is compared with a preset voltage level V2 (e.g., 4.2V for Lithium Ion cells), for example, by the command converter 426, to determine whether a constant voltage charging mode (e.g., a standard constant voltage charging mode $CV_0$) can be enabled or not. In one embodiment, if the average cell voltage of the battery pack 304 is greater than the preset voltage level V2, which indicates that the battery pack 304 can be charged in a constant voltage charging mode (e.g., a standard constant voltage charging mode $CV_0$), the flowchart goes to block 524.

In block 524, the constant voltage charging mode (e.g., a standard constant voltage charging mode $CV_0$) is enabled by the control signal 350. In block 526, a protection check (similar to block 506) is performed. If there is any undesirable condition, the flowchart goes to block 530 to terminate battery charging (charging termination mode). Otherwise, the flowchart goes to block 528.

In block 528, if all the cells in the battery pack 304 are fully charged, the flowchart goes to block 530 to terminate charging (charging termination mode). Otherwise, the flowchart returns to block 524 and the battery pack 304 continues to be charged under a constant voltage charging mode (e.g., a standard constant voltage charging mode $CV_0$) as shown in block 524. In one embodiment, the command converter 426 receives voltage monitoring signals from the monitoring circuit 424 and determines whether all the cells are fully charged.

Returning to block 508, if the average cell voltage of the battery pack 304 is less than the predetermined voltage level V2, which indicates that the battery pack 304 can still be charged in a standard/light constant current charging mode, the flowchart goes to block 510.

In block 510, the highest cell voltage is compared with a preset voltage V1 (e.g., 3.9V for Lithium Ion cells), for example, by the command converter 426. The preset voltage V1 is used to determine whether to perform an unbalance check. In one embodiment, if the highest cell voltage is greater than the preset voltage V1, the unbalance check will be performed and the flowchart goes to block 512. If the highest cell voltage is less than the preset voltage V1, the flowchart returns to block 504. Any repetitive description following block 504 that has been described above will be omitted herein for purposes of clarity and brevity.

In block 512, an unbalance check is performed. If there is no unbalanced condition, the flowchart returns to block 504. If there is any unbalanced condition, a bleeding current is enabled for any unbalanced cell (step not shown in flowchart 500), and the flowchart goes to block 514.

In block 514, a timer is started. In block 516, an average cell voltage of the battery pack 304 is compared with a preset voltage level V2 (similar to block 508), for example, by the command converter 426, to determine whether a constant voltage charging mode (e.g., a standard constant voltage charging mode $CV_0$) can be enabled or not. In one embodiment, if the average cell voltage of the battery pack 304 is greater than the preset voltage level V2, which indicates that the battery pack 304 can be charged in a constant voltage charging mode (e.g., a standard constant voltage mode $CV_0$), the flowchart goes to block 524. Any repetitive description following block 524 that has been described above will be omitted herein for purposes of clarity and brevity.

Returning to block 516, if the average cell voltage of the battery pack 304 is less than the preset voltage level V2, which indicates that the battery pack 304 can still be charged in a standard/light constant current charging mode, the flowchart goes to block 518. In block 518, if the timer expires (e.g., the timer runs up to a predetermined time), the flowchart goes to block 520. If the timer does not expire, the flowchart returns to block 516.

In block 520, n is compared with a predetermined maximum number max, for example, by the command converter 426. If n is equal to the predetermined maximum number max, the flowchart returns to block 504 to continue the light constant current mode $CC_{max}$. Otherwise, the flowchart goes to block 522. In block 522, n is increased by 1 and the flowchart returns to block 504. Any repetitive description following block 504 that has been described above will be omitted herein for purposes of clarity and brevity.

Figure 6:
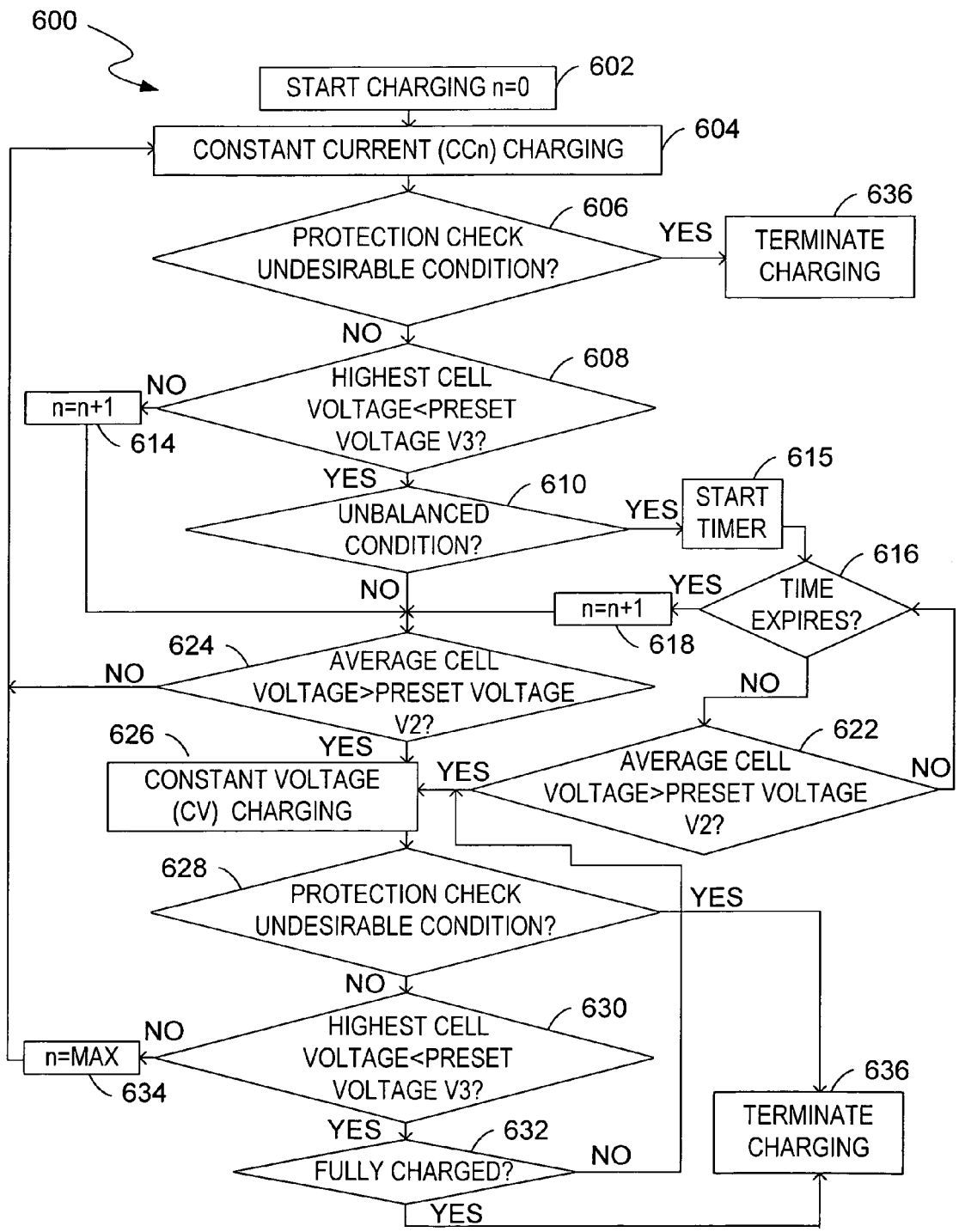
FIG. 6 shows another flowchart of operations performed by a battery management system, in accordance with one embodiment of the present invention.

FIG. 6 shows another flowchart 600 of operations performed by a battery management system, in accordance with one embodiment of the present invention. In one embodiment, the command converter 426 can be configured, such that the battery management system in FIG. 4 operates in a way shown in flowchart 600. FIG. 6 is described in combination with FIG. 3 and FIG. 4.

In the example of FIG. 6, the battery management system first charges the battery pack 304 in a standard constant current charging mode $CC_0$, in one embodiment. The battery management system charges the battery pack 304 in light constant current charging modes $CC_n$ (n=1, 2, ..., max) if any unbalanced condition occurs, in one embodiment. If an average cell voltage of the battery pack 304 is greater than a preset voltage level V2 (e.g., 4.2V for Lithium Ion cells), the battery management system charges the battery pack 304 in a constant voltage charging mode (e.g., a standard constant voltage charging mode $CV_0$), in one embodiment. If a highest cell voltage of the battery pack 304 is greater than a preset voltage V3 (e.g., 4.3V for Lithium Ion cells) and the average cell voltage is less than the preset voltage V2, the battery management system changes a constant current charging mode from $CC_n$ to $CC_{n+1}$, thereby reducing the charging current to enable over-voltage protection, in one embodiment. The battery management system also performs protection check, in one embodiment.

The battery management system starts charging the battery pack 304 and n (which represents different constant current charging modes) is initialized to 0 in block 602. Constant current charging mode $CC_n$ is enabled by the control signal 350 in block 604. For example, when n is set to 0, a standard current charging mode $CC_0$ will be enabled. When n is between 1 and max, a light current charging mode $CC_n$ (n=1, 2, ..., max) will be enabled. A protection check is performed in block 606. For example, the command converter 426 receives monitoring signals from the monitoring circuit 424 and determines whether any undesirable condition (e.g., over-voltage, over-current, and over-temperature) has occurred, in one embodiment. If there is any undesirable condition, the flowchart goes to block 636 to terminate battery charging (charging termination mode). As such, the command converter 426 will switch off the charging switch 430 to terminate battery charging. If there is no undesirable condition, the flowchart goes to block 608.

In block 608, a highest cell voltage is compared with a preset voltage V3, for example, by the command converter 426, in order to check if there is any over-voltage condition. If the highest cell voltage is greater than the preset voltage V3 (which indicates there is an over-voltage condition), the flowchart goes to block 614. In block 614, n is increased by 1. The flowchart goes to block 624 to check if a constant voltage charging mode (e.g., a standard constant voltage charging mode $CV_0$) can be enabled or not. If the highest cell voltage is less than the preset voltage V3 (which indicates there is no over-voltage condition), the flowchart goes to block 610.

In block 610, an unbalance check is performed. If there is no unbalanced condition, the flowchart goes to block 624 to check if a constant voltage charging mode (e.g., a standard constant voltage charging mode $CV_0$) can be enabled or not. If there is any unbalanced condition, a bleeding current is enabled for any unbalanced cell (step not shown in flowchart 600), and the flowchart goes to block 615.

In block 615, a timer is started. In block 616, if the timer expires, the flowchart goes to block 618 and n is increased by 1. The flowchart goes to block 624 to check if a constant voltage charging mode (e.g., a standard constant voltage charging mode $CV_0$) can be enabled or not.

In block 624, an average cell voltage is compared with a preset voltage V2, for example, by the command converter 426, in order to determine whether a constant voltage charging mode can be enabled or not. If the average cell voltage is less than the preset voltage V2, the flowchart returns to block 604. Any repetitive description following block 604 that has been described above will be omitted herein for purposes of clarity and brevity.

If the average voltage is greater than the preset voltage V2, the flowchart goes to block 626 to enable a constant voltage charging mode (e.g., a standard constant voltage mode $CV_0$).

Returning to block 616, if the timer does not expire, the flowchart goes to block 622 (similar to block 624) to check if a constant voltage charging mode (e.g., a standard constant voltage charging mode $CV_0$) can be enabled or not. In block 622, an average cell voltage is compared with the preset voltage V2, for example, by the command converter 426. If the average cell voltage is less than the preset voltage V2, the flowchart returns to block 616. Any repetitive description following block 616 that has been described above will be omitted herein for purposes of clarity and brevity. If the average cell voltage is greater than the preset voltage V2, the flowchart goes to block 626 to enable a constant voltage charging mode (e.g., a standard constant voltage charging mode $CV_0$).

In block 628, a protection check is performed (similar to block 606). If there is any undesirable condition, the flowchart goes to block 636 to terminate battery charging (charging termination mode). If there is no undesirable condition, the flowchart goes to block 630. In block 630, a highest cell voltage is compared with the preset voltage V3 (similar to block 608), for example, by the command converter 426, in order to check if there is any over-voltage condition. If the highest cell voltage is greater than the preset voltage V3 (which indicates that there is an over-voltage condition), the flowchart goes to block 634. In block 634, n is set to a predetermined maximum value max and the flowchart returns to block 604. As such, a minimum charging current $I_{max}$ ($I_0 > I_1 > I_2 > \ldots > I_{max}$) is enabled. If the highest cell voltage is less than the preset voltage V3 (which indicates that there is no over-voltage condition), the flowchart goes to block 632. In block 632, if all the cells are fully charged, the flowchart goes to block 636 to terminate charging. Otherwise, the flowchart returns to block 626 to continue a constant voltage charging mode. Any repetitive description following block 626 that has been described above will be omitted herein for purposes of clarity and brevity.

Figure 7:
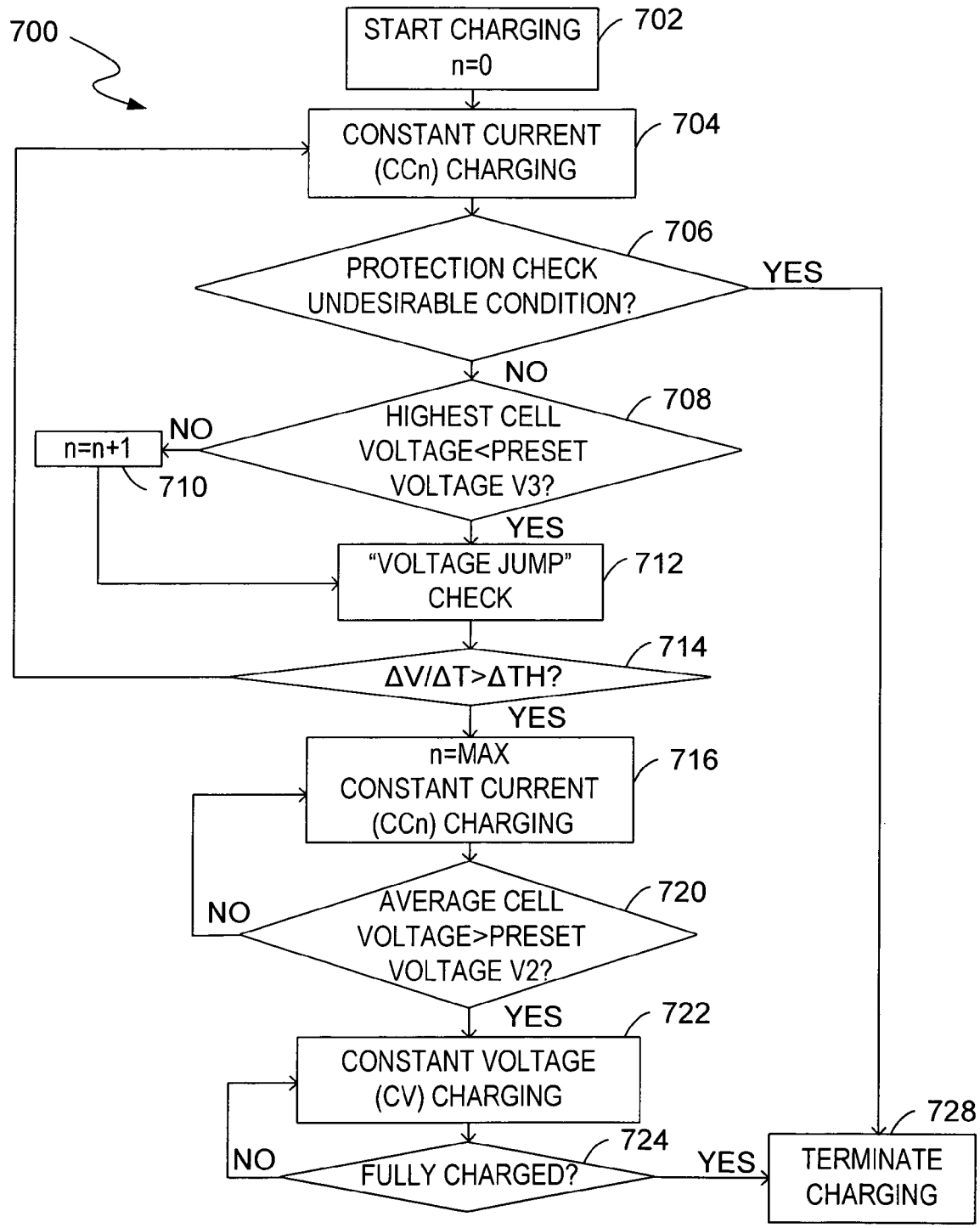
FIG. 7 shows another flowchart of operations performed by a battery management system, in accordance with one embodiment of the present invention.

FIG. 7 shows another flowchart 700 of operations performed by a battery management system, in accordance with one embodiment of the present invention. In one embodiment, for phosphate Lithium ion battery cells, a voltage of a cell increases rapidly after the cell reaches a certain voltage threshold (called "voltage jump"). As such, the flowchart 700 can be implemented to charge the phosphate Lithium ion battery cells by reducing a charging current when a "voltage jump" occurs, in one embodiment. In one embodiment, the command converter 426 can be configured, such that the battery management system in FIG. 4 operates in a way shown in flowchart 700. FIG. 7 is described in combination with FIG. 3 and FIG. 4.

In the example of FIG. 7, the battery management system first charges the battery pack 304 in a standard constant current charging mode $CC_0$, in one embodiment. The battery management system charges the battery pack 304 in light constant current charging modes $CC_n$ (n=1, 2, ..., max) if any over-voltage condition occurs, in one embodiment. In one embodiment, an over-voltage condition occurs if the highest cell voltage of the battery pack 304 is greater than a preset voltage V3 (e.g., 4.3V for Lithium Ion cells). If there is a "voltage jump", the battery management system charges the battery pack 304 in a light constant current charging mode (e.g., $CC_{max}$ with a minimum charging current $I_{max}$ ($I_0 > I_1 > I_2 > \ldots > I_{max}$)) in one embodiment. In one embodiment, a "voltage jump" is detected when an increase on a voltage (e.g., an individual cell voltage or an average cell voltage) over a time period $\Delta V/\Delta t$ is greater than a threshold level $\Delta th$. If an average cell voltage of the battery pack 304 is greater than a preset voltage level V2 (e.g., 4.2V for Lithium Ion cells), the battery management system charges the battery pack 304 in a constant voltage charging mode (e.g., a standard constant voltage charging mode $CV_0$), in one embodiment. The battery management system also performs protection check, in one embodiment.

The battery management system starts charging the battery pack 304 and n (which represents different constant current charging modes) is initialized to 0 in block 702. Constant current charging mode $CC_n$ is enabled by the control signal 350 in block 704. For example, when n is set to 0, a standard constant current charging mode $CC_0$ will be enabled. When n is between 1 and max, a light constant current charging mode $CC_n$ (n=1, 2, ..., max) will be enabled. A protection check is performed in block 706. For example, the command converter 426 receives monitoring signals from the monitoring circuit 424 and determines whether any undesirable condition (e.g., over-voltage, over-current, and over-temperature) has occurred, in one embodiment. If there is any undesirable condition, the flowchart goes to block 728 to terminate battery charging (charging termination mode). As such, the command converter 426 will switch off the charging switch 430 to terminate battery charging. If there is no undesirable condition, the flowchart goes to block 708.

In block 708, a highest cell voltage is compared with a preset voltage V3, for example, by the command converter 426, in order to determine if there is any over-voltage condition. If the highest cell voltage is greater than the preset voltage V3 (which indicates that there is an over-voltage condition), the flowchart goes to block 710. In block 710, n is increased by 1. The flowchart then goes to block 712 to perform a "voltage jump" check. If the highest cell voltage is less than the preset voltage V3 (which indicates that there is no over-voltage condition), the flowchart goes to block 712 directly.

In block 714, if an increase on a voltage (e.g., an individual cell voltage or an average cell voltage) over a time period $\Delta V/\Delta t$ is less than a threshold level $\Delta th$, the flowchart returns to block 704. Any repetitive description following block 704 that has been described above will be omitted herein for purposes of clarity and brevity.

If the increase on a voltage (e.g., an individual cell voltage or an average cell voltage) over a time period $\Delta V/\Delta t$ is greater than the threshold level $\Delta th$, the battery pack 304 will be charged under a light constant current charging mode (e.g., $CC_{max}$) in block 716. In one embodiment, the control signal 350 will control the adapter 302 to output a constant charging current ($I_{max}$) to charge the battery 304.

In block 720, a constant voltage charging mode (CV) check is performed. More specifically, an average voltage of the battery pack 304 is compared with a preset voltage level V2 to determine whether the constant voltage charging mode (e.g., a standard constant voltage charging mode $CV_0$) can be enabled. In block 720, if the average cell voltage of the battery pack 304 is less than the preset voltage level V2, which indicates that the battery pack 304 can still be charged in a light constant current mode, the flowchart returns to block 716.

In block 720, if the average cell voltage of the battery pack 304 is greater than the preset voltage level V2, the battery pack 304 will be charged under a constant voltage charging mode (e.g., a standard constant voltage charging mode $CV_0$) in block 722. The flowchart goes to block 724 to determine if all the cells are fully charged.

In block 724, if all the cells are fully charged, the charging process is terminated in block 728 (charging termination-mode). Otherwise, the flowchart returns to block 722 to continue charging the battery pack 304 under a constant voltage charging mode.

As described in relation to FIG. 5-FIG. 7, the battery pack 304 is charged under multiple constant current charging modes (e.g., standard constant current charging mode $CC_0$, light constant current charging mode $CC_1$-$CC_{max}$) and a constant voltage charging mode (e.g., a standard constant voltage charging mode $CV_0$), in one embodiment. Other charging methods can be implemented by configuring/programming the command converter 426. For example, the battery pack 304 can be charged under a constant current charging mode (e.g., a standard constant current charging mode $CC_0$) and multiple constant voltage charging modes (e.g., standard constant voltage charging mode $CV_0$, light constant voltage charging mode $CV_1$-$CV_{max}$), in one embodiment. The battery pack 304 can also be charged under multiple constant current charging modes (e.g., standard constant current charging mode $CC_0$, light constant current charging mode $CC_1$-$CC_{max}$) and multiple constant voltage charging modes (e.g., standard constant voltage charging mode $CV_0$, light constant voltage charging mode $CV_1$-$CV_{max}$), in one embodiment.

Figure 8:
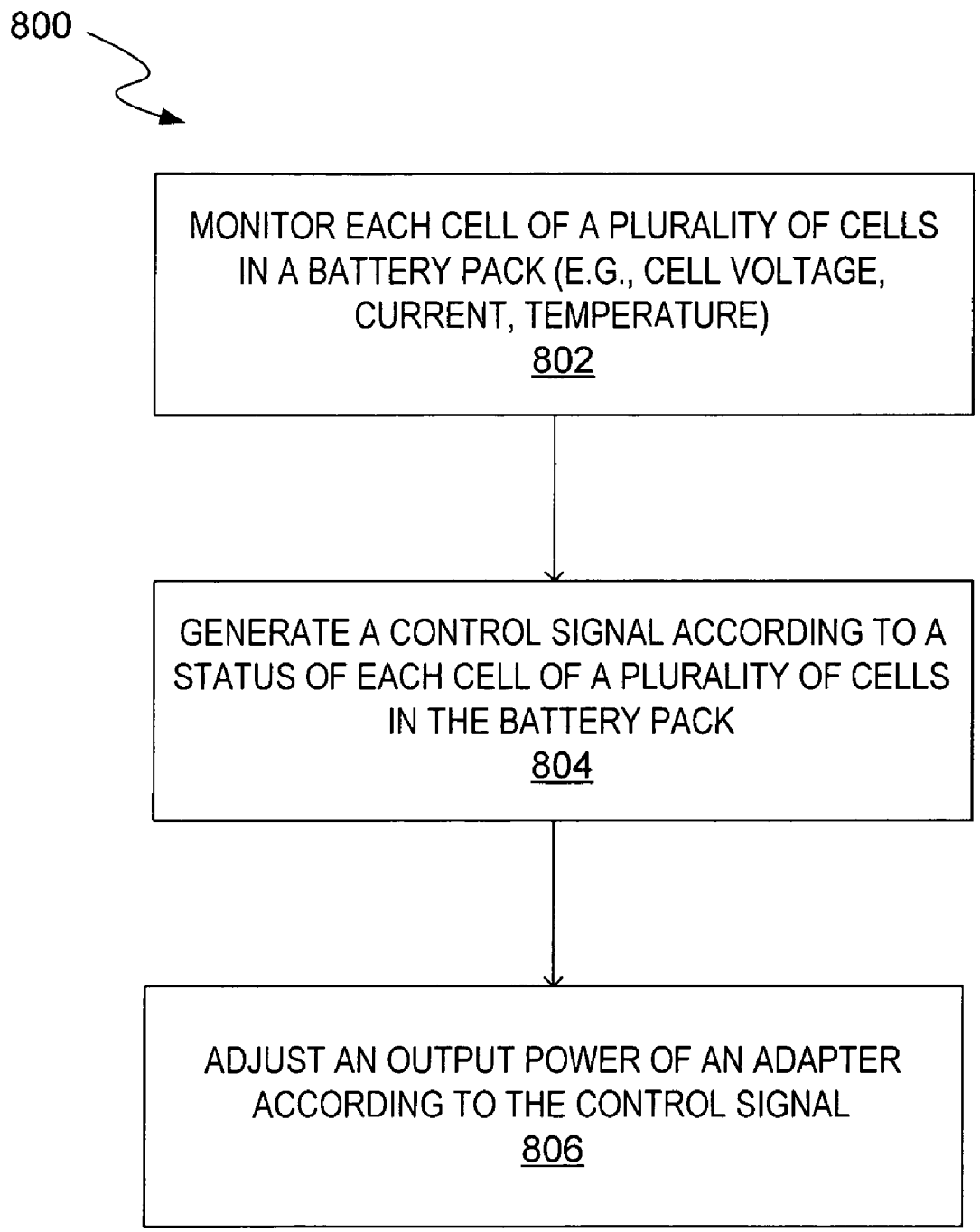
FIG. 8 shows a flowchart of operations performed by a battery management system, in accordance with one embodiment of the present invention.

FIG. 8 shows a flowchart 800 of operations performed by a battery management system, in accordance with one embodiment of the present invention. FIG. 8 is described in combination with FIG. 3 and FIG. 4.

As shown in FIG. 8, the battery management system monitors each cell of a plurality of cells in a battery pack 304 in block 802. For example, a monitoring circuit 424 monitors cell voltage, current, and temperature, etc., and generates a monitoring signal for each cell indicative of a status of each cell.

In block 804, the battery management system generates a control signal 350 according to the status of each cell of a plurality of cells in the battery pack 304. For example, the control signal 350 is generated according to monitoring signals 490_1-490_3, 492, and 494 as shown in FIG. 4.

In block 806, the battery management system adjusts an output power of an adapter 302 according to the control signal 350. For example, the battery management system adjusts the output power of the adapter 302 by controlling a duty cycle of a pulse width modulation signal in the adapter 302.

Accordingly, a battery management system is provided. In one such embodiment, a battery pack is able to adjust an output power of an adapter directly by a control circuit integrated in the battery pack. Advantageously, the output power of the adapter is adjusted according to individual cell status. Therefore, multiple charging modes can be enabled according to individual cell status, in one embodiment. As such, battery charging can be terminated when all the cells are fully charged and any undesirable condition can be avoided, in one embodiment.

In one embodiment, multiple charging modes can also be enabled according to battery pack status. For example, a standard constant current charging mode can be enabled at the beginning of charging. A light constant current charging mode can be enabled when the battery pack voltage is greater than a first threshold, in one embodiment. A light constant current charging mode can also be enabled when an increase on a battery voltage over a time period is greater than a second threshold. A constant voltage charging mode can be enabled when the battery pack voltage is greater than a third threshold, in one embodiment.

Figure 9:
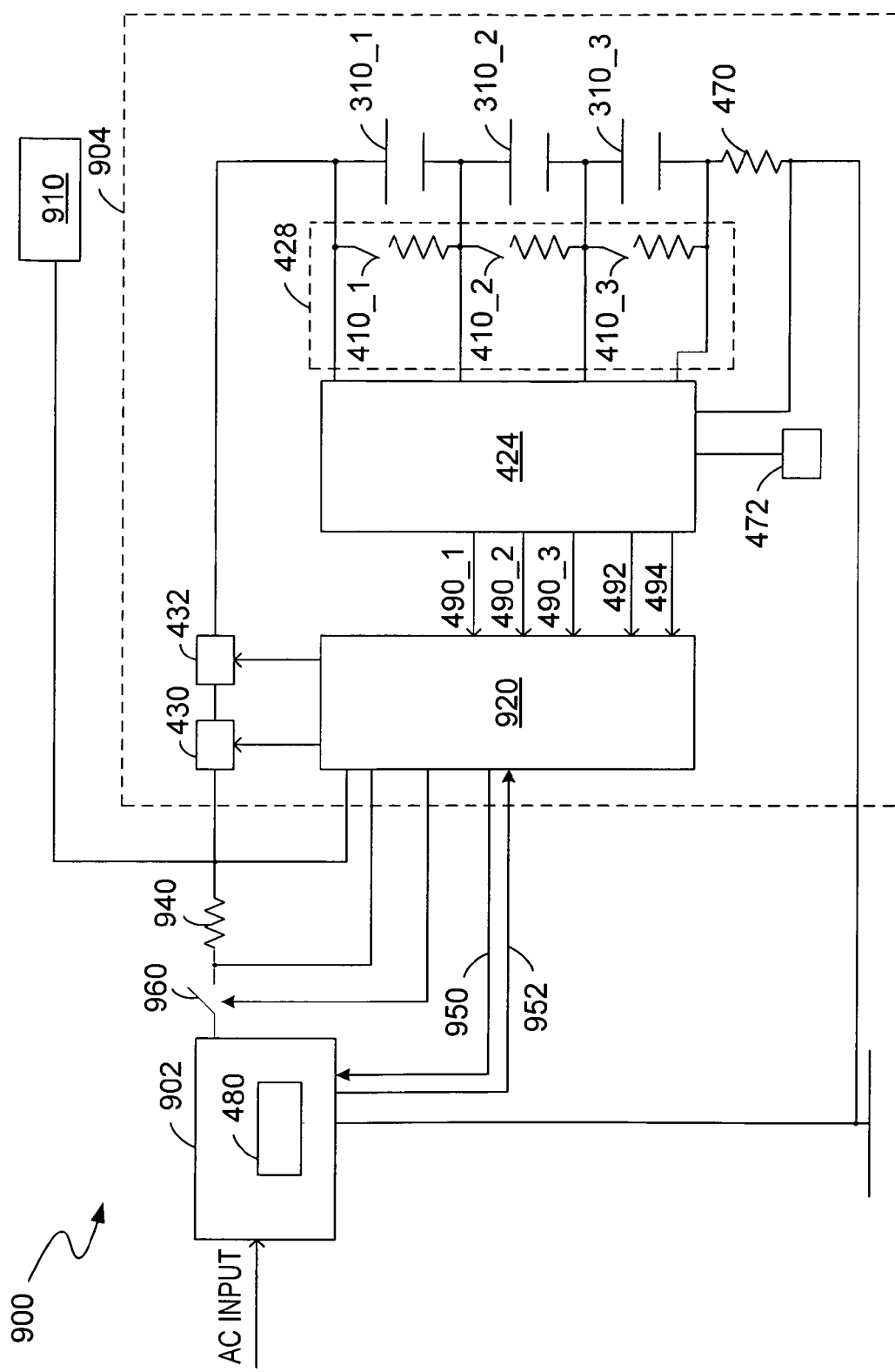
FIG. 9 shows a block diagram of a power management system, in accordance with one embodiment of the present invention.

FIG. 9 shows a block diagram of a power management system 900, in accordance with one embodiment of the present invention. Elements labeled the same as in FIG. 4 have similar functions and will not be detailed described herein.

The battery management system 900 includes an adapter 902 operable for charging a battery pack 904 and powering a system load 910. The adapter 902 can charge the battery pack 904 and power the system load 910 simultaneously, in one embodiment. The adapter 902 can generate a power recognition signal 952 indicative of a maximum adapter power to a battery controller 920 in the battery pack 904, and can receive a control signal 950 from the battery controller 920. The control signal 950 can be similar to the control signal 350 in FIG. 4. The power recognition signal 952 can be a voltage signal and the voltage level of the power recognition signal 952 can indicate a maximum available power from the adapter 902. The battery pack 904 includes the battery controller 920 and a monitoring circuit 424, in one embodiment. The battery controller 920 can receive the power recognition signal 952 from the adapter 902 and can generate the control signal 950 to adjust an output power of the adapter 902 according to a status of the battery pack 904 and a status of the system load 910. More specifically, the control signal 950 can be an analog control signal or a digital control signal. The control signal 950 can be used to adjust a duty cycle of a pulse width modulation (PWM) signal generated by a PWM signal generator 480 in the adapter 902 so as to adjust the output power of the adapter 902. In one embodiment, the power recognition signal 952 and the control signal 950 are transferred through a single bus/line. In another embodiment, the power recognition signal 952 and the control signal 950 are transferred through two signal buses/lines respectively.

The battery controller 920 can monitor an output current from the adapter 902 by monitoring a voltage on a sensing resistor 940. For example, a differential amplifier (not shown in FIG. 9) can be coupled to the sensing resistor 940 to amplify the voltage on the sensing resistor 940 and to generate an analog monitoring signal indicative of the output current from the adapter 902. An A/D converter (not shown in FIG. 9) can be coupled to the differential amplifier for converting the analog monitoring signal to a digital signal indicative of the output current from the adapter 902.

The battery controller 920 can also receive monitoring information of the battery pack 904 from the monitoring circuit 424. As described in relation with FIG. 4, the monitoring circuit 424 can monitor a cell status (e.g., cell voltage, cell current, cell temperature, and cell capacity) for each individual cell 310_1-310_3, and protect each cell 310_1-310_3 from any undesirable conditions (e.g., over-voltage, over-current, over-temperature, and over-charge), in one embodiment. The monitoring circuit 424 also monitors a battery current (e.g., a battery charging current) via a sensing resistor 470 and generates a monitoring signal 492 indicating a level of the battery current. The battery controller 920 can receive the monitoring information from the monitoring circuit 424. Advantageously, the battery controller 920 can calculate the total power/current drawn by the system load 910 according to a difference between the output current from the adapter and the battery charging current.

Advantageously, the battery controller 920 can adjust the output power of the adapter 902 according to the status of the battery pack 904 (e.g., the charging current of the battery pack 904 or the power used to charge the battery pack 904) and the status of the system load 910 (e.g., the current flowing to the system load 910 or the total power for powering the system load 910). In other words, the output power of the adapter 910 can be dynamically and automatically adjusted according to the system needs and the battery needs/status. For example, if the battery pack 904 is required to be charged in a constant charging current mode $CC_1$, the battery controller 920 can adjust the control signal 952 such that the battery pack 904 is charged by a constant charging current $I_1$ while the system load 910 still receives enough power and operates properly. The battery controller 920 can operate in a way similar to the steps as described in relation to FIG. 5-FIG. 7, in one embodiment.

In one embodiment, the battery controller 910 adjusts the charging current of the battery pack 904 according to the output power of the adapter 902, e.g., according to the monitoring signal indicative of the output current of the adapter 902. For example, the monitoring signal indicative of the adapter output current can be generated by monitoring the sensing resistor 940. In one embodiment, when the battery controller 920 detects that the output power of the adapter reaches the maximum adapter power (e.g., when the monitoring signal indicative of the output current of the adapter is equal to or greater than a predetermined threshold), the battery controller 920 can decrease/cut off the charging current of the battery pack 904 in order to ensure enough power to be delivered to the system load 910 such that the system load 910 can operate properly. In one embodiment, the battery controller 920 can switch off the charging switch 430 to cut off the charging current. In another embodiment, since the charging switch 430 can be enabled by a pulse width modulation signal generated by the battery controller 920, the battery controller 920 can reduce the charging current by decrease the duty cycle of the pulse width modulation signal which controls the charging switch 430. Advantageously, the battery controller 920 can dynamically allocate power between the system load 910 and the battery pack 904 based on the output power of the adapter 902, in one embodiment.

In one embodiment, the battery controller 920 generates a signal to switch off a switch 960 which is coupled between the adapter 902 and the battery pack 904 if an undesirable condition (or a fault condition) of the adapter 920 occurs. For example, when the battery controller 920 detects that an output voltage of the adapter 902 is greater than a predetermined threshold, the switch 960 can be switched off to protect the battery pack 904 and the system load 910.

Figure 10:
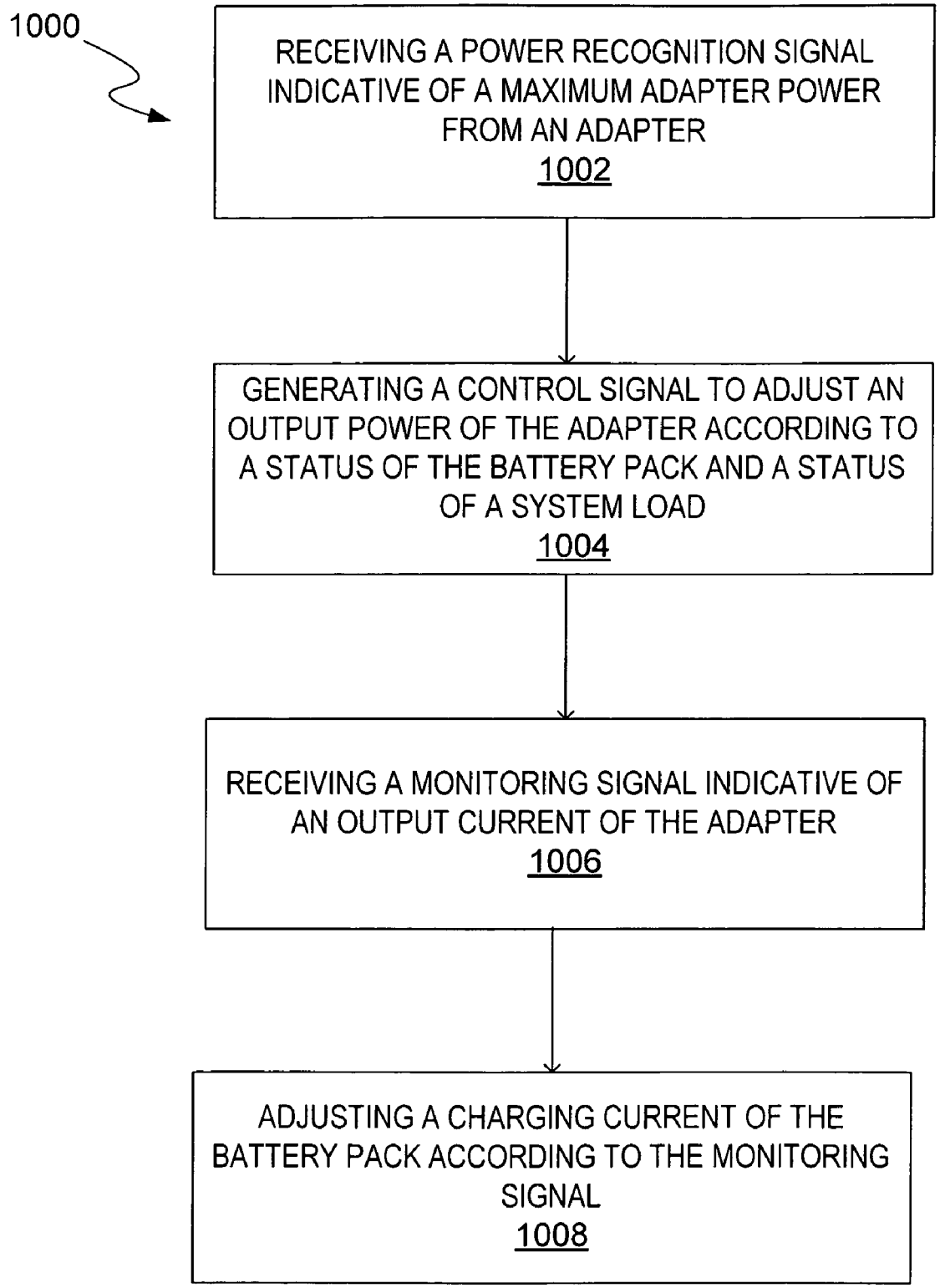
FIG. 10 shows a flowchart of operations performed by a power management system, in accordance with one embodiment of the present invention.

FIG. 10 shows a flowchart 1000 of operations performed by a battery controller, e.g., the battery controller 920, in one embodiment. FIG. 10 is described in combination with FIG. 9.

In block 1002, a power recognition signal 952 indicative of a maximum adapter power is received, e.g., from the adapter 902. In block 1004, a control signal 950 is generated, e.g., by the battery controller 920, to adjust an output power of the adapter 902 according to a status of the battery pack 904 and a status of a system load 910 powered by the adapter 902. In block 1006, a monitoring signal indicative of an output current of the adapter 902 is received, e.g., by the battery controller 920. In block 1008, the charging current of the battery pack 904 can be adjusted according to the monitoring signal indicative of the output current of the adapter 902. Advantageously, in one embodiment, when the battery controller 920 detects that the output power of the adapter reaches the maximum adapter power (e.g., when the monitoring signal indicative of the output current of the adapter is equal to or greater than a predetermined threshold), the battery controller 920 can decrease/cut off the charging current of the battery pack 904 in order to ensure enough power to be delivered to the system load 910 such that the system load 910 can operate properly.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A power management system comprising an adapter operable for charging a battery pack, powering a system load, and generating a power recognition signal indicative of a maximum adapter power of said adapter; and a battery controller in said battery pack and for receiving said power recognition signal, and for generating a control signal to adjust an output power of said adapter according to a status of said battery pack and a status of said system load, and for controlling said battery pack according to said power recognition signal and said output power of said adapter; and a monitoring circuit configured to monitor a cell voltage, cell current, cell temperature and cell capacity status for each cell, and protect each cell from over voltage, over current, over temperature, and over charge conditions; and monitoring circuit monitors and generates a monitoring signal fro each cell; and a command converter integrated in the battery pack used to generate control signal for controlling an output power of the adapter based on individual cell status.

2. The power management system as claimed in claim 1, wherein said status of said battery pack comprises a level of a charging current of said battery pack.

3. The power management system as claimed in claim 1, wherein said status of said battery pack comprises a status of each cell of a plurality of cells in said battery pack.

4. The power management system as claimed in claim 1, wherein said battery controller receives a monitoring signal indicative of an output current of said adapter.

5. The power management system as claimed in claim 4, wherein said battery controller adjusts a charging current of said battery pack according to said monitoring signal.

6. The power management system as claim in claim 1, wherein said adapter comprises a pulse width modulation signal generator operable for generating a pulse width modulation signal, and wherein a duty cycle of said pulse width modulation signal is controlled by said control signal.

7. The power management system as claimed in claim 1, wherein said battery pack comprises a monitoring circuit for monitoring each cell of a plurality of cells in said battery pack and for generating a monitoring signal indicating a status of each cell to said battery controller.

8. The power management system as claimed in claim 1, wherein said control signal comprises an analog control signal.

9. The power management system as claimed in claim 1, wherein said control signal comprises a digital control signal.

10. The power management system as claimed in claim 1, wherein said power recognition signal and said control signal are transferred through a single bus.

11. The power management system as claimed in claim 1, further comprising:
a switch coupled between said adapter and said battery pack,
wherein said battery controller generates a signal to switch off said switch if an undesirable condition of said adapter occurs.

12. A battery pack comprising: a monitoring circuit for monitoring each cell of a plurality of cells in said battery pack and generating a monitoring signal indicating a status of each cell; and a battery controller coupled to said monitoring circuit and for receiving a power recognition signal indicative of a maximum adapter power of an adapter, and for generating a control signal to control an output power of said adapter according to said monitoring signal and a status of a system load powered by said adapter, and for controlling said battery pack according to said power recognition signal and said output power of said adapter; and a monitoring circuit configured to monitor a cell voltage, cell current, cell temperature and cell capacity status for each cell, and protect each cell from over voltage, over current, over temperature, and over charge conditions; and monitoring circuit monitors and generates a monitoring signal fro each cell; and a command converter integrated in the battery pack used to generate control signal for controlling an output power of the adapter based on individual cell status.

13. The battery pack as claimed in claim 12, wherein said battery controller also generates said control signal according to a level of a charging current of said battery pack.

14. The battery pack as claimed in claim 12, wherein said battery controller receives an adapter monitoring signal indicative of an output current of said adapter.

15. The battery pack as claimed in claim 14, wherein said battery controller further adjusts a charging current of said battery pack according to said adapter monitoring signal.

16. The battery pack as claimed in claim 12, wherein said control signal comprises an analog control signal.

17. The battery pack as claimed in claim 12, wherein said control signal comprises a digital control signal.

18. The battery pack as claimed in claim 12, wherein said power recognition signal and said control signal are transferred through a single bus.

19. The battery pack as claimed in claim 12, wherein said battery controller generates a signal to switch off a switch coupled between said adapter and said battery pack if an undesirable condition of said adapter occurs.

20. A method comprising: receiving a power recognition signal indicative of a maximum adapter power of an adapter; generating a control signal to adjust an output power of said adapter according to a status of a battery pack and a status of a system load powered by said adapter; and controlling said battery pack according to said power recognition signal and said output power of said adapter; and a monitoring circuit configured to monitor a cell voltage, cell current, cell temperature and cell capacity status for each cell, and protect each cell from over voltage, over current, over temperature, and over charge conditions; and monitoring circuit monitors and generates a monitoring signal fro each cell; and a command converter integrated in the battery pack used to generate control signal for controlling an output power of the adapter based on individual cell status.

21. The method as claimed in claim 20, further comprising:
receiving a monitoring signal indicative of an output current of said adapter.

22. The method as claimed in claim 21, further comprising:
adjusting a charging current of said battery pack according to said monitoring signal.

23. The method as claimed in claim 20, further comprising:
monitoring each cell of a plurality of cells in said battery pack; and
generating a monitoring signal indicating a status of each cell.

24. The method as claimed in claim 20, further comprising:
transferring said power recognition signal and said control signal through a single bus between said adapter and said battery pack.

25. The method as claimed in claim 20, further comprising:
switching off a switch coupled between said adapter and said battery pack if an undesirable condition of said adapter occurs.

26. The method as claimed in claim 20, wherein said status of said battery pack comprises a level of a charging current of said battery pack.

27. The method as claimed in claim 20, wherein said status of said battery pack comprises a status of each cell of a plurality of cells in said battery pack.

28. The power management system as claimed in claim 1, further comprising:
a switch coupled between said adapter and said battery pack,
wherein said battery controller decreases a duty cycle of a pulse width modulation signal that controls said switch if said output power of said adapter reaches said maximum adapter power.

* * * * *